Aug. 16, 1960  C. R. BELL  2,949,258
MONITORING APPARATUS FOR AUTOMATIC PILOT SYSTEMS
Filed June 30, 1953
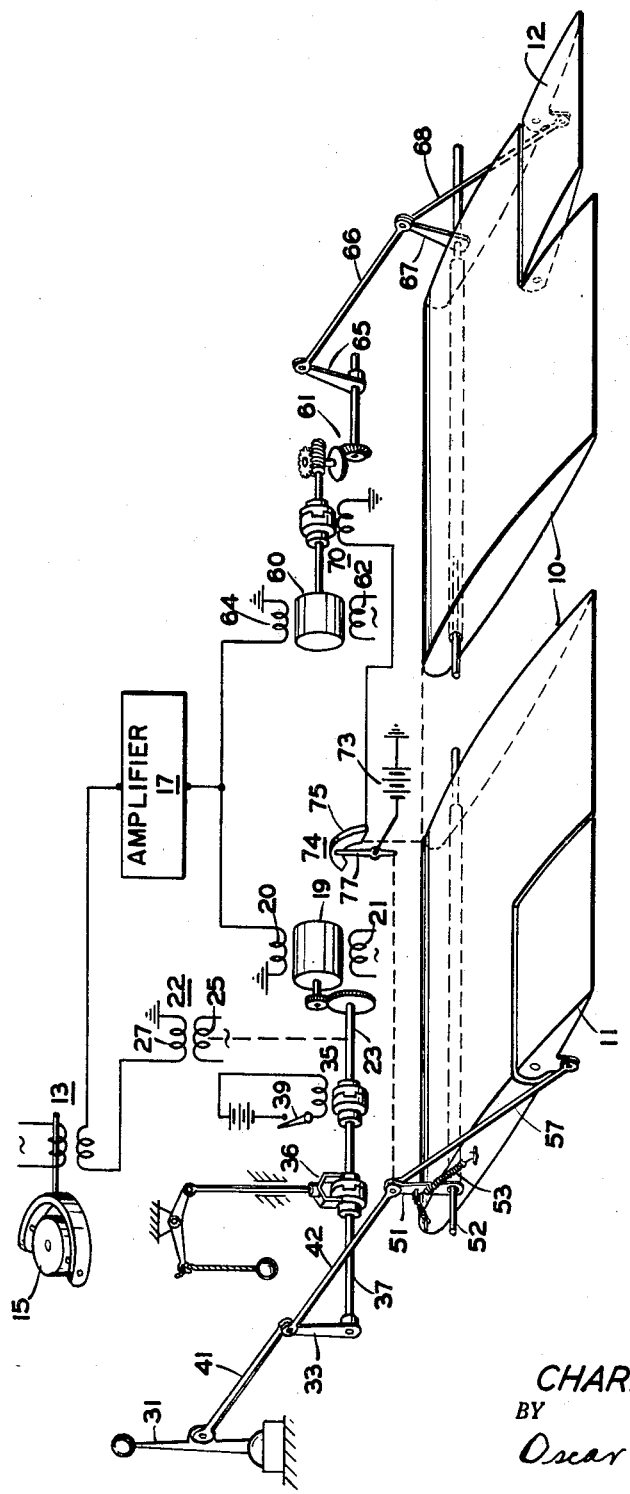
INVENTOR.
CHARLES R. BELL
BY
Oscar B Brumback
ATTORNEY United States Patent Office 2,949,258
Patented Aug. 16, 1960

2,949,258
MONITORING APPARATUS FOR AUTOMATIC PILOT SYSTEMS

Charles R. Bell, Bergenfield, N.J., assignor to Bendix Aviation Corporation, Teterboro, N.J., a corporation of Delaware Filed June 30, 1953, Ser. No. 365,017

14 Claims. (Cl. 244—77)

This invention relates generally to automatic control systems and more particularly to a monitor for the operation of an automatic pilot system on a control surface and a trim surface of an airborne craft.

An automatic pilot system maintains an aircraft in a stable attitude about one or more of its axes by suitable actuation of an airfoil which may have a main portion and one or more auxiliary aerodynamic control tabs for example, a spring tab and a trim tab.

In the spring tab control system for airfoils, the force exerted by an automatic pilot system operates the main body of the airfoil in one direction and the control tab in another direction; the force being applied to the control tab directly and to the main portion of the airfoil indirectly through resilient connections such as springs. When the craft is in flight, the deflection of the control tab applies to the airfoil a torque which tends to deflect the main portion of the airfoil in the same sense as the torque which the automatic pilot system applies to the main portion of the airfoil.

The spring tab applies a boost or assisting torque. The torque applied by the automatic pilot system through the resilient connection to the main portion of the airfoil, is proportional to the yielding of the connection. Under conditions of proper operation, the actuation of the main control surface is accomplished through the spring coupling. The springs are preloaded to a set value. If the force required to move the main control surface exceeds the setting of the springs, relative motion occurs between the control mechanism and the body of the control surface. This relative motion results in deflection of the spring tab relative to the main control surface; the deflection being in such a direction as to aid the control action from the servo or human pilot.

The purpose of the trim tab is to relieve the automatic pilot system of the need of applying a sustained torque to keep the craft in level flight when the trim condition of an aircraft is changed due to changes in loading as, for example, to the movement of the passengers and fuel consumption. To compensate for a change in trim condition about the pitch axis with the elevator surface alone, the elevator would be displaced from a streamlined position; the torque for this displacement being supplied by the human pilot during manual control of the craft and by the servomotors of the automatic pilot system during automatic control. When the airfoil has an aerodynamic control tab which is used as a trim tab, this tab being equipped with an irreversible drive, supplies and maintains the torque or hinge moment so that the average force applied by the human pilot or automatic pilot system can be reduced to zero despite change in the trim condition of the craft.

The employment of a trim tab, however, presents a disadvantage. Since failures may occur in any system as complex as an automatic pilot system despite extreme care in its design and maintenance; the provision of an automatic trim tab control system increases the number of possible failures or malfunctions. As an illustration, should the elevator control surface become locked or be incorrectly moved, the automatic pilot system may move the trim tab to its extreme position in attempting to maintain the craft in a desired attitude. This may result in the application of an excessive force to the control surface which, upon mechanically releasing the restraining or overpowering force on the control surface, will result in its immediate application to the control surface, causing the aircraft to execute a sudden maneuver whose violence would depend upon the amount of trim tab deflection.

An object of the present invention, therefore, is to provide a novel apparatus for limiting the force that can be applied to a control surface by a trim surface.

Another object is to provide a novel apparatus for monitoring the operation of an automatic pilot system on the trim tab surface of an aircraft.

Still another object is to provide apparatus for limiting the forces involved in moving the surfaces to correspond with the actual operating conditions in effect at that time.

A further object is to minimize loading on the control surface of a craft by trim tab operation, should the control surface become locked, to permit the human pilot to secure control of the craft manually without undue exertion.

Another object is to provide a means for limiting the amount of trim tab displacement in the event that the operation of the control surface is blocked.

The present invention contemplates a novel apparatus for monitoring an automatic steering system which actuates a control surface and a trim tab surface to maintain an aircraft in a predetermined attitude. The novel apparatus contemplates taking advantage of the small degree of lost motion that occurs as the main control surface reacts back through a yieldable coupling to the control mechanism, when the control surface is subjected to a loading exceeding that set by the yieldable coupling, to monitor the loading of the surface by the trim tab. It is contemplated that this lost motion, which is dependent upon the aerodynamic loading on the main control surface and is proportional to the deflection of the yieldable coupling, be utilized to render the automatic steering system ineffective to operate the trim tab when a predetermined loading on the control surface is exceeded.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

In the single sheet of drawing, the novel monitoring apparatus of the present invention is diagrammatically illustrated in operative association with the elevator surfaces of a conventional aircraft equipped with an automatic control system.

Referring to the drawing for a more detailed description of the invention, the pitch control airfoil section may be comprised of a main elevator control surface 10, a spring or control tab 11 and a trim tab 12. The automatic control system may be generally of the type described in U.S. Patent No. 2,265,348, issued January 13, 1953, to P. A. Noxon et al.

In the automatic control system, an inductive pitch attitude take-off 13 on a conventional vertical gyro 15, in a known manner, develops a pitch reference signal which corresponds in amplitude and phase to the amount and direction of deviation of the craft from a predetermined pitch attitude. This signal is applied to a suitable amplifier 17 which detects the phase of the signal and develops an output for operating a servomotor 19; the output energizing the variable phase winding 20 of motor 19, whose fixed phase winding 21 is continuously energized, to operate the motor in a clockwise or counterclockwise direction depending upon the phase of the signal. Motor 19 transforms the electrical energy into mechanical motion to move the elevator to correct for the deviation.

A follow-up device 22 is provided so that the displacement of the elevator will correspond to the deviation of the craft from reference. As shaft 23 of motor 19 turns, it displaces the rotor 25 of follow-up device 22 relative to its stator 27 to develop a signal corresponding to the displacement of the elevator. This signal is in opposition to the pitch attitude signal. Therefore, when the amplitudes of the two signals are equal, the net input signal to amplifier 17 is zero and motor 19 stops with the surface displaced. As the displaced elevator surface returns the craft to the predetermined pitch attitude, the pitch attitude signal from inductive device 13 decreases and the follow-up signal from inductive device 22 returns the elevator to its normal streamlined position.

Servomotor 19 and manual control stick 31 are connected to an arm 33. The shaft 23 of motor 19 is connected and disconnected from the shaft 37 of arm 33 by way of a magnetic clutch 35. Clutch 35 is energized by moving a switch 39 to a closed circuit position to engage the faces of the clutch. A suitable link 41 connects control stick 31 to arm 33.

When clutch 35 is disengaged or a mechanical disconnect 36 which may be the type described in U.S. Patent No. 2,634,841, issued April 14, 1953, to N. B. Murphy is actuated to disconnect servomotor 19 from arm 33, the control surface may be moved by the manipulation of stick 31. Also, the torque of motor 19 is limited so that in an emergency the human pilot can move the control surface by stick 31 against the operation of motor 19 even though clutch 35 is engaged.

Through a linkage 42, arm 33 moves an arm 51 which is rotatable on a shaft 52. Arm 51 is connected by tension springs 53 to elevator surface 10 and by a linkage 57 to a control tab 11. Thus, in the event that springs 53 are deflected, the indirect movement imparted to elevator surface 10 by arm 51 through springs 53 is opposite in direction to the direct movement of control tab 11 by arm 51 through linkage 57. The torque exerted by control tab 11 on elevator 10 will thus aid the control effort exerted through the spring 53 to move the elevator surface.

The load applied by way of springs 53 to the elevator surface without substantial deflection of the springs represents the torque that is normally required to move the elevator. At this time, elevator 10 and spring tab 11 move as a unit. In the event that springs 53 are deflected, to this torque is imparted a further torque by the deflection of the control tab 11. Thus, the torque applied through springs 53 normally is not sufficient to deflect the springs 53 but any excessive force required will deflect the spring and thus gain the aid of the spring tab 11 as additional force to aid the human pilot or servomotor in controlling the airplane.

The servomotor 60 which moves trim tab surface 12 through an irreversible transmission shown generally at 61 is an induction motor having a continuously energized fixed phase winding 62 and a variable winding 64 which is connected to the output of amplifier 17 in parallel with the primary or elevator servomotor. The trim tab servomotor moves an arm 65 which through a linkage 66 moves an arm 67 which is rotatable on shaft 52, and arm 67 through linkage 68 moves trim tab surface 12. Thus an output of amplifier 17 that results in a clockwise rotation of elevator surface 10 will result in counterclockwise rotation of the trim tab motor. Accordingly, the trim tab is deflected in a direction opposite from that in which the elevator surface is deflected.

A displacement signal developed at the pitch attitude take-off device 13 of the artificial horizon gyroscope 15 by a nose or tail heavy attitude of the aircraft will operate servomotors 19 and 60: servomotor 19 will displace the elevator surface 10 to bring the craft back to its correct flight attitude; and servomotor 60 will deflect trim tab 12 at the same time. Since the deflection of the trim tab 12 is opposite to that of elevator 10, this deflection will assume a part of the loading on elevator 10 thereby decreasing the torque required of servomotor 19. The operation of servomotors 19 and 60 continues until the follow-up signal developed at follow-up device 21 by the operation of the elevator servomotor 19 tends to offset the initiating displacement signal by becoming equal in amplitude.

If the center of gravity of the craft changes, a new angle of attack of the elevator is required to maintain the craft in level flight. The new angle of attack of the primary surface 10 will require the application of a torque to the surface to maintain this new position. The residual signal in the control circuit supplies this torque to the elevator surface motor; the power being supplied to both the elevator servo 19 and the trim tab servo 60. The trim tab servo will be operated in response to the torque requirements of the primary servomotor 19 to position the trim tabs; and the continuing positioning of the trim tabs will decrease the loading of the elevator servo, permitting the residual signal of the system to be wiped out. The power supplied then to both servomotors is cut-off, and the trim tab surface will be left in a displaced position so that it may continuously react upon the aircraft to maintain the desired attitude.

The apparatus so far described is intended to represent a conventional automatic pilot system. While the automatic pilot system works well in practice, the possibility is present that the elevator surface may for some reason become locked and the displacement of the trim tab be continued.

As an example of the foregoing possibility, a displacement of the aircraft in pitch results in a corresponding signal being sent to servomotors 19 and motor 60. Should the elevator surfaces for some reason become locked, motor 19 cannot operate; motor 60, however, moves trim tab surface 12 in an attempt to correct for the deviation in pitch attitude. In doing this, servomotor 60 may displace trim tab 12 to its outermost limits. Should the human pilot then operate switch 39 or the mechanical disconnect 36 to disengage the servosystem of the automatic pilot, the aerodynamic pressure built up on the elevator surface as a result of displacement of the trim tab may by an action similar to that of the spring tab and cause the elevator surface to move rapidly and place the craft in a violent maneuver. This torque applied to the elevator surface may be greater than the human pilot can exert through the manipulation of stick 31.

The novel monitoring system of the present invention overcomes the foregoing possibility.

In accordance with the present invention, a magnetic clutch 70 connecting motor 60 and trim tab 12 is connected to an energy source 73 through a switch 74 actuated by arm 51. This switch is comprised of an arcuate contact 75 and a wiper 77. Magnetic clutch 70 is energized from a suitable source such as battery 73 through the arc 75 and wiper 77; arc 75 being fixed and wiper 77 being connected to arm 51. Therefore, should the elevator surface move relative to arm 51 an amount greater than the limited arc afforded by contact 75, the solenoid of magnetic clutch 70 between motor 60 and trim tab 12 is deenergized. Magnetic clutch 70 is disengaged, motor 60 cannot operate the trim tab, and the irreversible gearing 61 holds the trim tab in its last position. Springs 53 are so adjusted that predetermined forces within desirable limits allow extension of the springs enough for wiper 77 to move off arc 75. In this manner, the novel monitoring system of the present invention keeps trim tab 12 from exerting a pressure on the elevator airfoil greater than that which is normally exerted by the manual controller 31 on the elevator surface.

Springs 53 may be so designed that when the load on arm 51 exceeds a predetermined amount, for example, thirty pounds, the springs are brought into operation to assist in moving elevator surface 10. When a change in trim occurs a signal from pitch take-off 13 is sent to servomotors 19 and 60. In the event that the elevator servomotor 19 is for some reason mechanically blocked, it cannot operate yet servomotor 60 will operate to move surface 12. The action of trim tab surface 12 will move elevator surface 10 stressing spring 53. When this movement exceeds a predetermined amount which may be as little as one third degree, wiper 77 and arc 75 are no longer in engagement and clutch 70 is deenergized. This disengages servomotor 60 from operation of trim tab 12. Upon the actuation of mechanical disconnect 36 or magnetic clutch 35, the loading on the elevator surface 10 by trim tab 12 will not exceed that which can be exerted through stick controller 31.

The foregoing has presented a novel monitoring system for the control surface and trim surface of an aircraft. With this monitor, forces cannot be built up by the trim tab displacement greater than are controllable by normal manual control of the craft. Should the control surface become locked because of some failure in the system, the trim surface displacement is kept within safe limits for manual operation.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. An automatic steering system for aircraft having a main control surface and a trim surface, comprising first means operatively connected with said main control surface for operating the latter, second means operatively connected with said trim surface for operating the latter, the operation of said trim surface relative to said main surface exerting a torque on the latter, and means operatively connected with said second named means and responsive to a torque on said main surface in excess of a predetermined maximum for stopping the operation of said second means on said trim surface.

2. An automatic control system for an aircraft having a main control surface, a spring tab surface, and a trim tab surface, comprising a first servomotor, means for connecting said first servomotor with said spring tab surface and said control surface including a yieldable lost motion means whereby said servomotor normally operates said main surface and after a predetermined loading has been applied to said main surface operates said spring tab surface, a second servomotor, second means normally connecting said second servomotor and said trim surface, said trim surface when operated applying a load to said control surface, and means responsive to the loading of said control surface for actuating said second means to render said second servomotor ineffective on said surface.

3. An aircraft having a main control surface, a spring tab surface, and a trim tab surface, comprising first power means, means connecting said control surface and said spring tab surface with said first power means whereby said power means normally operates said control surface and after a predetermined torque has been applied to said control surface operates said spring tab surface, second power means, means normally effective for connecting said second power means and said trim tab surface, and means operatively connected with said control surface and said last named means and responsive to a load on said control surface exceeding predetermined limits for rendering said last named means ineffective for connecting said second power means and said trim tab surface.

4. In an automatic pilot system having a control surface, a spring tab, and a trim tab, means for operating said control surface, said spring tab and said trim tab, said control surface being subject to excessive loads thereon whose magnitude are indicated by relative motion of said control surface and spring tab, and means operatively connected with said surfaces and responsive to loads on said control surface exceeding predetermined limits for rendering the trim tab operating means ineffective to operate the trim tab.

5. In an automatic pilot system having a control surface, a spring tab, and a trim tab, power means for operating said control surface and said spring tab, power means for operating said trim tab, said control surface during operation by said power means being subject to excessive loads thereon whose magnitude are indicated by relative motion of said control surface and spring tab, and means operatively connected with said surfaces and responsive to loads on said control surface exceeding predetermined limits for rendering the trim tab power means ineffective to operate the trim tab.

6. In the steering system of an aircraft having movable control and trim surfaces, means operatively connected with said control surface for moving it manually, means operatively connected with said control surface for moving it automatically, means operatively connected with said trim surface and normally effective to move the trim surface, and means operatively connected with said control surface and said last-named means and responsive to the load on the control surface for rendering the last named means ineffective on said trim surface at a predetermined maximum load.

7. In an automatic control system for an aircraft having a control surface with relatively movable spring and trim tabs, means operatively connected with said trim tab and normally effective thereon to trim the craft for a predetermined attitude, and means operatively connected with said control surface, spring tab and trim tab for rendering said first named means ineffective on said trim tab upon a predetermined relative movement of said control surface and spring tab.

8. In an automatic control system for an aircraft having a control surface with relatively movable spring and trim tabs, a servomotor, means for operatively connecting and disconnecting said servomotor and said trim tab, and means operatively connected with said control surface and spring tab and actuated by a predetermined relative movement of said control surface and spring tab for actuating said connecting and disconnecting means to disconnect said servomotor and said trim tab.

9. In an automatic control system for an aircraft having a control surface with relatively movable spring and trim tabs, a servomotor, clutch means for operatively connecting and disconnecting said servomotor and said trim tab, and switch means operatively connected with said control surface and spring tab and actuated by a predetermined relative movement of said control surface and spring tab for actuating said clutch means to disconnect said servomotor and said trim tab.

10. A steering system for an aircraft having movable control and trim surfaces comprising first and second members operatively connected with said control surface for applying a force to the latter, one of said members being adapted for actuation by human exertion and the other for actuation by automatic control means, means operatively connected with said trim tab and normally effective for operating said trim tab to apply a force to said control surface, and means operatively connected with said control surface and said last-named means and responsive to the force applied to said control surface for rendering said last-named means ineffective when said force approaches that which can normally be applied by human exertion.

11. A steering system for an aircraft having a control surface with relatively movable force assisting and trim surfaces, comprising first and second force members, one of said force members being adapted for operation by automatic power means and the other by human exertion, means connecting said members and said control and force assisting surfaces whereby after a predetermined force is applied to said control surface, said force assisting surface is moved relative to said control surface, means operatively connected with said trim tab and normally effective for moving said trim surface to apply a further force to said control surface, and means operatively connected with said last-named means and actuated by the force on said control surface for rendering said last-named means ineffective on said trim surface.

12. An automatic control system for an aircraft having a main control surface and a trim tab surface for applying a load on said control surface, first power means, means for connecting said first power means and said main control surface so that the latter is actuated by the former, second power means, means for connecting and disconnecting said second power means and said trim tab surface for rendering the second power means effective for actuating the trim tab surface and for disconnecting said second power means and said trim tab surface for rendering the second power means ineffective for actuating the trim tab surface, said connecting and disconnecting means including an irreversible drive whereby said trim tab surface remains in its last position when said second power means is rendered ineffective, and means operative when the load on said control surface exceeds predetermined limits for causing said last named means to disconnect said second power means.

13. In an automatic steering system having a main control surface and first and second auxiliary surfaces, first means for operating said first auxiliary surface to apply a first load to said control surface, second means for operating said second auxiliary surface to apply a second load to said control surface, the relative deflection of said control surface and said first surface being a measure of the total load on said control surface, means for measuring the relative deflection of said first and said control surface, and means responsive to said last named means for rendering said second means ineffective when said deflection exceeds a predetermined amount.

14. An automatic control system for an aircraft having a main control surface and a trim surface, comprising a first servomotor, means for connecting said first servomotor and said main control surface for actuating the latter, a second servomotor, second means for connecting and disconnecting the second servomotor and trim surface for operating and discontinuing the operation of the trim surface respectively, and monitoring means connected with said second means for actuating the second means to disconnect said second servomotor and said trim surface upon application of a load greater than a predetermined maximum to said main control surface due to movement of the trim surface to thereby avoid a greater load on the main control surface than can be handled manually.

References Cited in the file of this patent

UNITED STATES PATENTS

| | | |
|---|---|---|
| 2,511,846 | Halpert | June 20, 1950 |
| 2,553,694 | Wendt | May 22, 1951 |
| 2,568,719 | Curry | Sept. 25, 1951 |
| 2,623,717 | Price | Dec. 30, 1952 |
| 2,626,114 | Alderson | Jan. 20, 1953 |
| 2,663,001 | Rusler | Dec. 15, 1953 |
| 2,809,000 | Brannin et al. | Oct. 8, 1957 |